R. GIBBS.
Clevis-Bars and Hooks.

No. 139,381.  Patented May 27, 1873.

Witnesses:
G. Matthys
Solon C. Kenion

Inventor:
Robert Gibbs
per _____
Attorneys.

UNITED STATES PATENT OFFICE.

ROBERT GIBBS, OF SPRING HILL, MISSOURI.

IMPROVEMENT IN CLEVIS BARS AND HOOKS.

Specification forming part of Letters Patent No. 139,381, dated May 27, 1873; application filed February 19, 1873.

*To all whom it may concern:*

Be it known that I, ROBERT GIBBS, of Spring Hill, in the county of Livingston and State of Missouri, have invented a new and useful Improvement in Clevis-Bar and Clevis-Hook; and I do hereby declare the following to be a full, clear, and exact description of the same, reference being had to the accompanying drawing forming a part of this specification.

The invention relates to certain improvements upon the subject-matter of my patent No. 107,037, granted September 6, 1870.

The invention consists, first, in a peculiar mode of constructing and combining the clevis-bar with its brace; second, in a peculiar construction of double hook for clevis-bars or whiffletrees; third, in a novel mode of swiveling the shank of a clevis-hook in the clevis-bar and combining it with a laterally-adjustable front plate.

Figure 1:
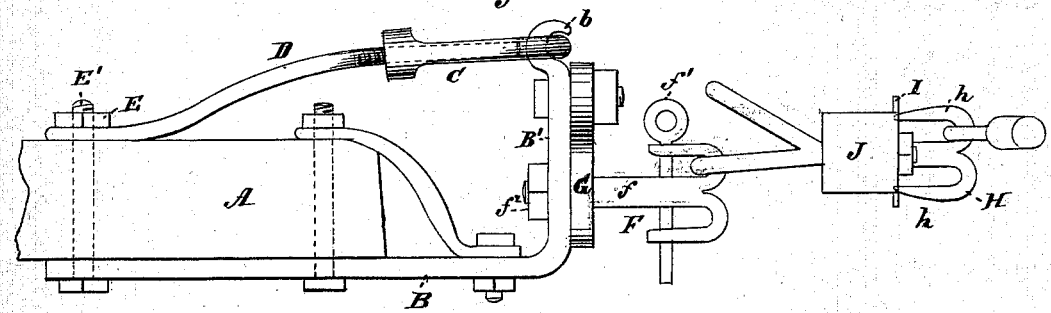
Figure 3:
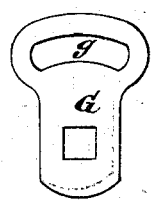
Figure 4:
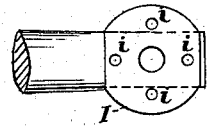
Figure 2:
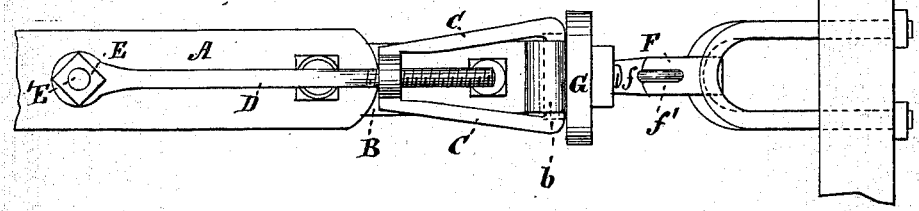

Figure 1 is a side elevation of the several devices connected. Fig. 2 is a plan view of the same. Fig. 3 is a plan or face view of the plate for adjusting the angle of the double clevis-hook; and Fig. 4 represents the perforated plate with which the prongs of the single-tree hook are connected.

In the drawing, A represents the plow-beam, on which is a clevis-bar, B, the upper end of whose front piece B' is turned back and curled forward so as to form a hook, $b$. By this improved construction of the clevis-bar I can dispense with the brace described in my former patent, and use one composed of a simple yoke-nut, C, whose front loop-end is held by the hook $b$, while its rear end receives the swiveled screw D. The clevis-bar and swivel-screw are clamped respectively to the under and upper side of beam A by a nut and screw, E E'. F is a hook intended to receive the staple of whiffletree and made double, the two hooks being flat and reversed in their direction. By this construction the same shank $f$ and the same pin $f^1$ answer for two hooks and two separate adjustments of the depth. The shank $f$ passes through a round hole in the vertical front piece B' of clevis-bar, is threaded on the inner end, and receives the nut $f^2$. Between the front piece B' and the hooks is inserted plate G, having a square hole to receive a squared portion of shank $f$. The plate G has a cross-slot, $g$, near its upper end and a clamp-screw and nut to hold it at different points of lateral adjustment. By this construction the swiveled hook F is allowed play from side to side. This enables the plow or plows to be secured in any desired position. H is a single-tree staple made with two reversed hooks, $h\ h$, held in the single-tree by a nut at the rear end and by a plate, I, located on the front. This plate has pairs of perforations $i\ i$, into which enter the opposite ends of hooks $h\ h$. This serves to secure the staples firmly in their intended position.

Having thus described my invention, what I claim as new, and desire to secure by Letters Patent, is—

1. A clevis-bar having front piece B' with the hook $b$, combined on a plow-beam with yoke-nut C and screw-rod D, as and for the purpose described.

2. A staple, F, having shank $f$ with two reversed hooks at the end and a single pin, $f^1$, combined, as and for the purpose set forth.

3. A hook having the shank $f$ swiveled in front piece B' of clevis-bar and combined rigidly with a laterally-adjustable plate, G, as and for the purpose specified.

ROBERT GIBBS.

Witnesses:
JOHN C. HARGRAVE,
B. F. BERRY.